United States Patent [19]

Smithson et al.

[11] 3,964,528
[45] June 22, 1976

[54] CATALYST CHANGING SYSTEM

[75] Inventors: Harold Smithson, Westtown; John F. Stahl, Exton, both of Pa.

[73] Assignee: Oxy-Catalyst, Incorporated, West Chester, Pa.

[22] Filed: May 10, 1974

[21] Appl. No.: 468,746

[52] U.S. Cl. ............................... 141/67; 23/288 F; 141/378; 259/DIG. 42
[51] Int. Cl.² ......................................... B65B 1/08
[58] Field of Search .............. 141/67, 68, 69, 71–81, 141/65, 340, 387, 1, 5, 8, 11, 12, 65, 66, 84, 93, 98, 270, 324, 363, 364, 369, 375, 378; 23/288 F; 222/193; 259/72, DIG. 42; 55/309; 302/51

[56] References Cited
UNITED STATES PATENTS

| | | | |
|---|---|---|---|
| 3,295,565 | 1/1967 | Grandy | 141/67 |
| 3,865,159 | 2/1975 | Mayfield | 141/67 |

*Primary Examiner*—Houston S. Bell, Jr.
*Attorney, Agent, or Firm*—Paul & Paul

[57] ABSTRACT

Unitary system for changing catalyst particles in a catalytic converter mounted in a vehicle exhaust system. The system attaches to and hangs from the converter, applied rotary off-center vibration, and collects the liberated particles in a self-supporting canister. Vacuum means, acting through the exhaust pipe, aids in starting the emptying process and acts to refill the converter.

23 Claims, 6 Drawing Figures

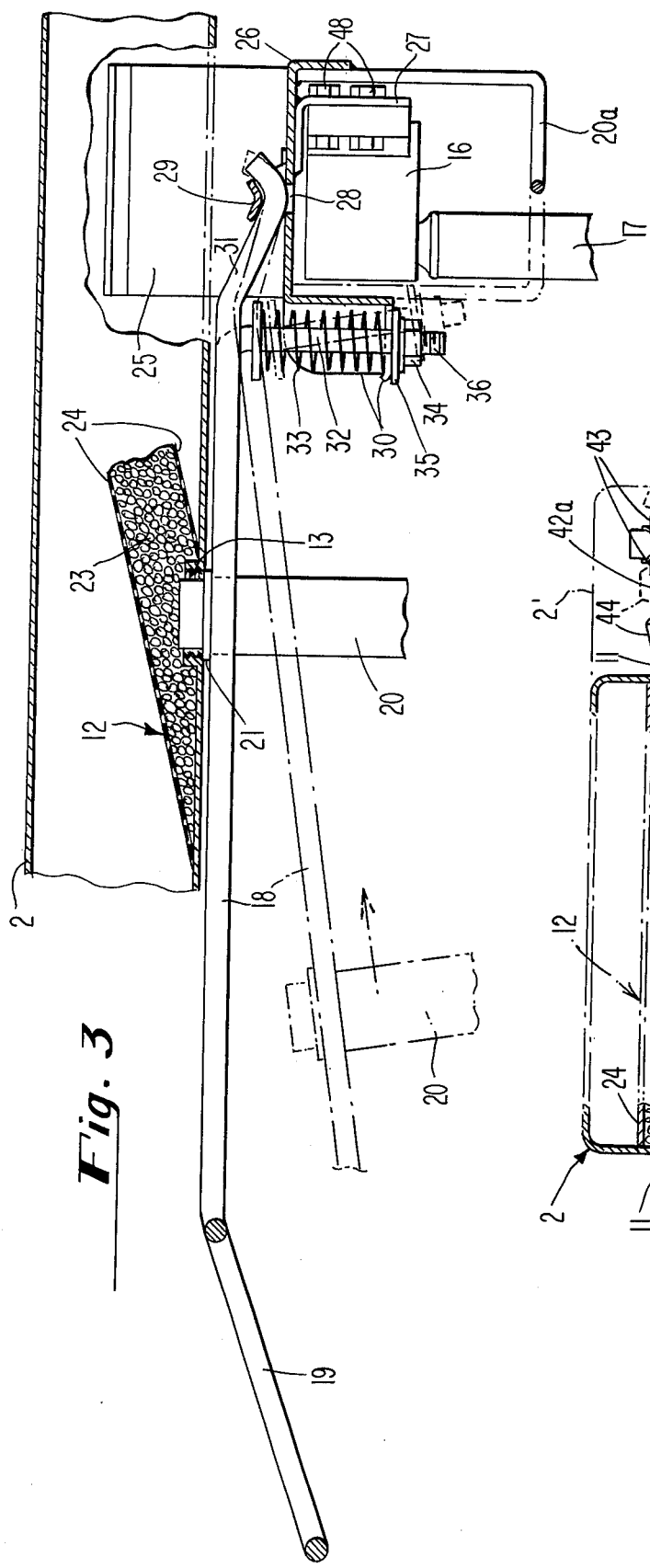
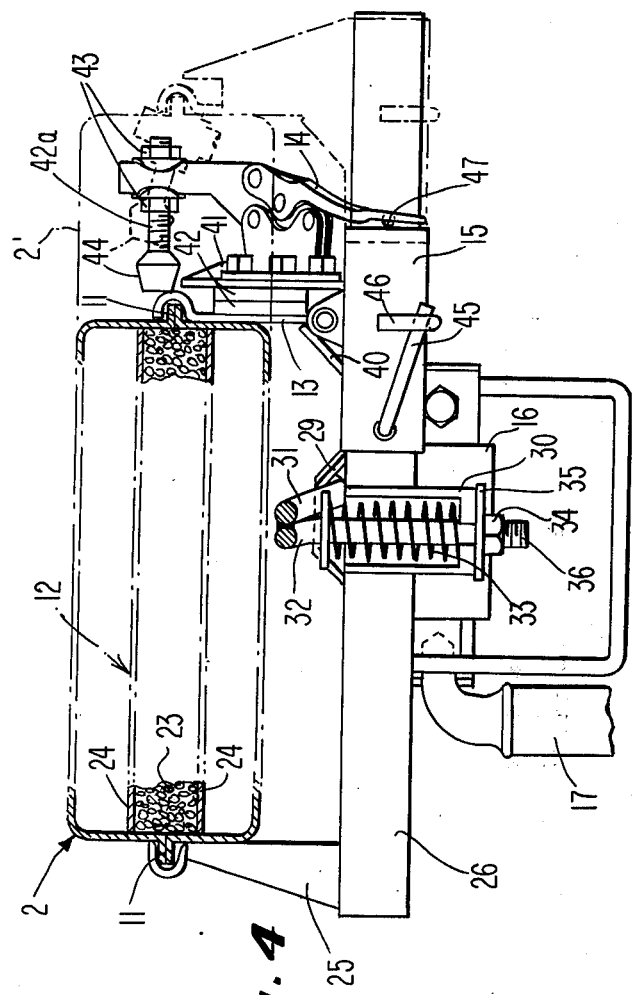

CATALYST CHANGING SYSTEM

BACKGROUND OF THE INVENTION

A number of exhaust purifiers have been developed which rely upon catalytic oxidation to remove impurities from the exhaust fumes of internal combustion engines. The present invention facilitates the efficient removal and replacement of used catalytic particles from these purifiers, resulting in ease of maintaining operating efficiency of this type of pollution control device.

Generally, catalytic exhaust systems require the provision of a large, catalytic surface area over which hot exhaust gases may pass. One common method of providing such a surface area is to provide a bed of discrete catalytic particles each of which has a surface coating of precious metal based catalytic material.

The active catalyst materials presently in use are rare and expensive, and it is impractical to provide a large enough supply of catalytic particles to compensate for natural attrition over an unlimited period of time. Also, the catalytic material can become poisoned and inactive due to contamination from various sources including the lead contained in the gasoline. For these reasons, numerous systems have been devised to rejuvenate catalyst particles which have become degraded or inactive.

Patent application Ser. No. 240,969 entitled "Method and Apparatus for Exchanging Catalyst in a Catalytic Converter", owned by the assignee of the present invention, provides a system for emptying and refilling the catalytic particle bed of a horizontal-bed purifier. Further, U.S. Pat. Nos. 3,181,291 and 3,295,565, assigned to the assignee hereof, show vacuum systems for removing and replacing catalytic particles.

Prior catalyst changing systems have often employed a suction wand for the removal of particles from the catalyst bed. These systems require access to the end of the purifier housing, which is normally mounted in a position directly under the "floor boards" of the automobile. Access to these purifiers is normally available because horizontal-bed catalytic exhaust purifiers require a mounting position providing substantial road clearance. This clearance is necessitated by the thickness which results from the requirement that the intake and exhaust ports be vertically displaced by a distance greater than the thickness of the particle bed area.

The more recent sloped-bed design reduces the total under-floor clearance required while increasing the effective surface area of the catalyst bed. It generally takes the shape of a flat rectangular box formed of top and bottom halves which are joined with a protruding longitudinal flange. Intake and exhaust ports are provided usually at either end of the housing. The inclined catalytic bed is usually formed by grids which connect to the housing above the intake port at one end and below the exhaust port at the other end. This diagonal arrangement of the catalytic bed provides an increased catalytic surface area over which the exhaust gases must pass.

In some models, such as those represented in the drawings herein, the intake and exhaust ends of the purifier are rounded or diagonally truncated to reduce the space required for installation and to facilitate more efficient gas flow through the purifier. One of the most popular of these truncated purifiers is octagonally shaped, two sides being elongated to increase the distance between the intake and exhaust ports, and the two sides in which the ports are formed being abbreviated to the approximate diameter of the pipes to which they are connected. While this is the general form, the shape may vary depending upon the type and size of automobile to be facilitated.

In order to achieve the design advantages described above, sloped-bed catalytic purifiers possess certain inherent structural disadvantages. Unlike previous cylindrical purifiers, the fill hole in a sloped-bed catalytic purifier cannot conveniently be placed on any vertical side of the purifier due to the thickness of the purifier housing and the characteristic longitudinal flange which contributes to the purifier's durability. Consequently, the most popular location for the fill hole is on the bottom surface of the purifier at its intersection with the particle bed. This presents an unusual difficulty in exchanging the catalytic particles, since the exchange procedure must be performed while the purifier is mounted on the automobile; the purifier cannot be inverted for a gravity fill, as might be accomplished during manufacture. One reason for this is that there is a danger of attrition in particles which are not fully compacted in the converter, which might happen if the converter is pulled off the vehicle and the catalyst changed on the bench. Also, another reason for not removing the converter from the vehicle is to maintain the integrity of factory connections which prevent poisonous carbon monoxide from leaking into the passenger compartment.

While gravity alone might be suggested to empty contaminated particles, field conditions demonstrate that this is not feasible due to exhaust residues which coincidentally build up in the particle bed and which cause contaminated particles to clump and otherwise lodge against the particle bed grids. Furthermore, the elongation and reduction in width of the purifier results in slightly inclined particle beds which encourage particles to lodge in the narrow recesses thereof. For all of these reasons, it is very difficult to dislodge and to remove catalytic particles from a converter which has been used for an extended period of time.

An object of the present invention is to provide a clampable vibrator for use in a system for emptying and refilling the fixed catalytic bed of a catalytic exhaust purifier.

Another object of the invention is to provide a self-supporting catalyst changer which may be used to change the catalyst in a motor vehicle with ease and efficiency.

Another object of the invention is to provide a quick and thorough means for removing catalyst particles from the catalytic exhaust purifier and for refilling with fresh particles and compacting the fresh particles.

Another object of the invention is to provide a device which facilitates gentle handling of the catalytic particles during the exchange process.

Still another object of the invention is to provide substantially complete emptying of a catalyst bed under conditions of extreme contamination, and to facilitate refilling the bed so that replacement particles substantially completely occupy the particle bed area in a tightly packed configuration.

Yet another object of the invention is to provide a device which is self-contained and can be stored conveniently in one piece, which is economical, compact, quiet, clean, non-clogging, rugged and flexible enough to handle various types of catalytic purifiers, and suitable for use in facilities equipped with nothing more than standard "gas station" equipment.

BRIEF DESCRIPTION OF DRAWINGS

FIG. 3 is an enlarged view in cross section, taken as indicated by the lines and arrows 3—3 which appear in FIG. 2, with an alternate position of the support arm shown in phantom line.

FIG. 4 is an enlarged view in cross section, taken as indicated by the lines and arrows 4—4 which appear in FIG. 2, with an alternate toggle position and a second larger purifier shown in phantom lines.

DETAILED DESCRIPTION OF THE DRAWINGS

Figure 1:
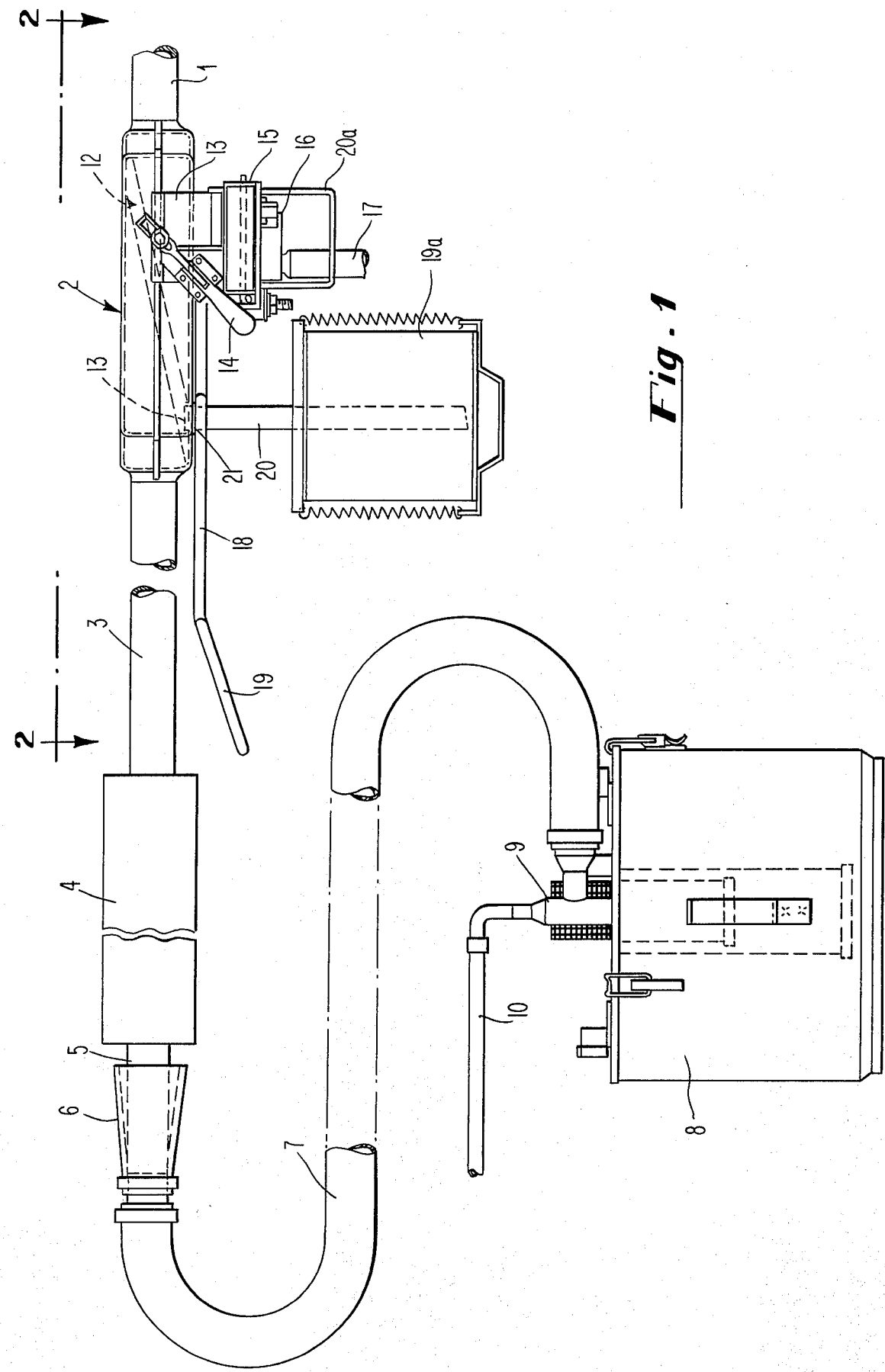
FIG. 1 is a diagrammatic overall side view of a catalytic particle changing system embodying features of this invention, in association with a sloped-bed catalytic exhaust purifier, exhaust pipes, muffler, and tailpipe.

Although specific forms of the invention have been selected for illustration in the drawings, and the following description is drawn in specific terms for the purpose of describing these forms of the invention, this description is not intended to limit the scope of the invention which is defined in the appended claims.

FIG. 1 is a side view showing an entire catalytic particle changing system, attached to the catalytic converter or purifier 2 which is installed in the exhaust pipe 1, 3. The exhaust pipe 3 is connected to the muffler 4, which carries the tailpipe 5.

According to this invention, for applying a vacuum to assist in changing the catalyst particles that are carried within the purifier 2, a high temperature resistant flexible connector 6 may be attached to and detached from the tailpipe 5. The connector 6 is fastened to a high-temperature resistant flexible hose 7 which is connected to a filtered, compressed-air-powered vacuum tank 8 which carries a vacuum aspirator 9, usually of the Venturi type and constructed and arranged to convert the flow of compressed air introduced through source 10 into a suitable vacuum applied to tailpipe 5 for operation of the system.

Figure 2:
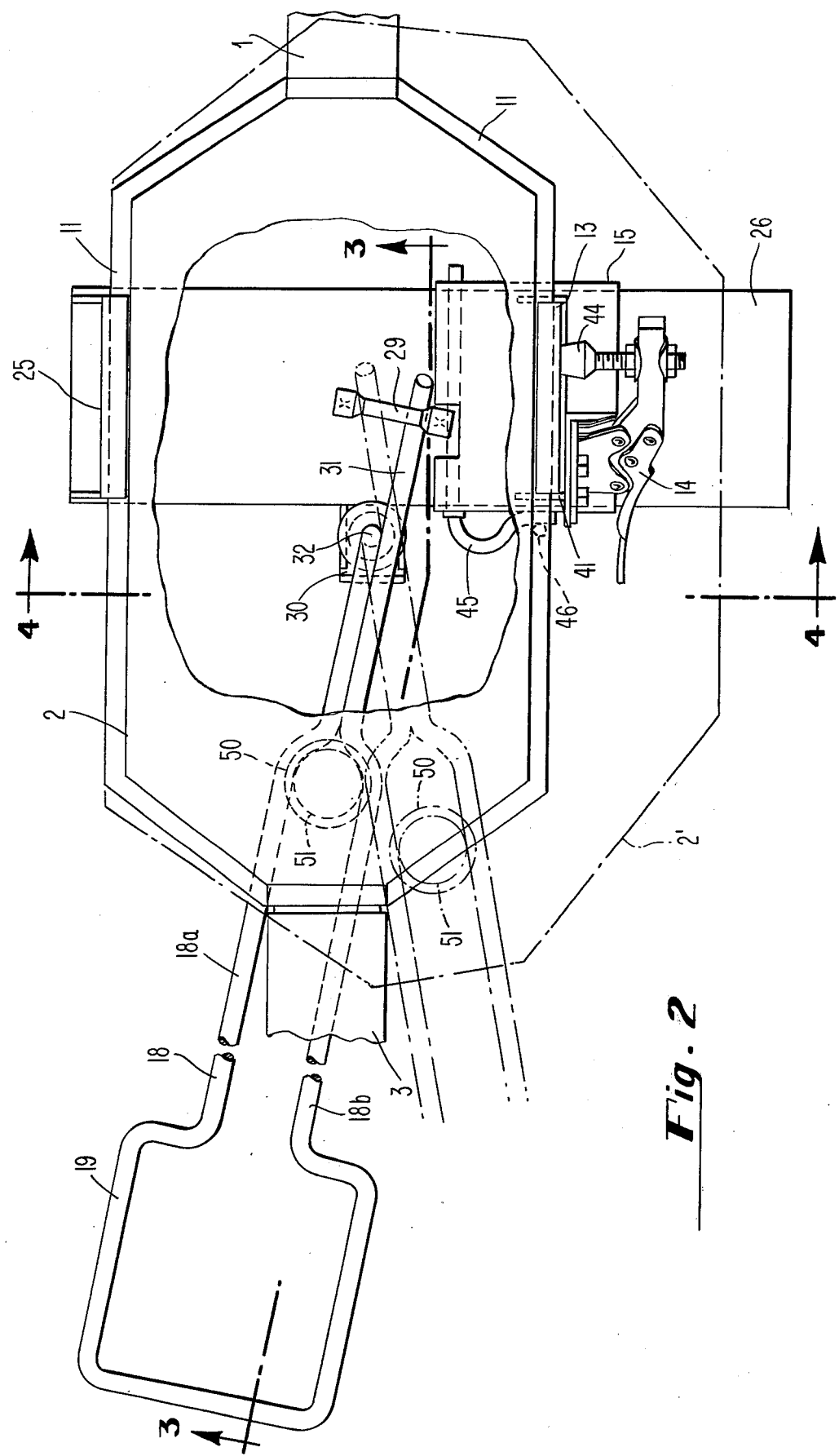
FIG. 2 is an enlarged plan view taken as indicated by the lines and arrows 2—2 which appear in FIG. 1, showing an octagonal sloped-bed catalytic exhaust purifier, with the cover partially cut away to reveal important features. A larger octagonal purifier is shown in phantom lines. An alternate support arm position is also shown in phantom lines.

FIGS. 1 and 2 further show that the catalytic exhaust purifier 2 carries longitudinally extending flanges 11, 11 encompassing the purifier 2 except for its junctions with exhaust pipes 1 and 3. The exhaust purifier 2, as best seen in FIGS. 1 and 3, contains parallel, spaced grids 24 defining an inclined catalytic bed generally designated 12, which is connected to a fill hole 13 communicating through the bottom surface of the catalytic exhaust purifier 2.

In FIGS. 1–4, a clamping device, which comprises an important component of the present invention, is shown in association with the catalytic exhaust purifier 2. The flanges 11, 11 of purifier 2 are engaged by hangers 22 and 25 which slidably engage the longitudinal flanges 11, 11. An adjustable travel over-center toggle clamp 14 is provided to secure the clamping device to the catalytic exhaust purifier. A vibrator motor 16 is carried in a critically important manner and relationship by the clamping device and connected to a conduit 17 through which passes compressed air to vibrate the clamping assembly, and consequently to vibrate the entire catalytic purifier 2 in a unique manner. An electric vibrating motor, similarly mounted and arranged, is alternatively acceptable.

Also hung from the flanges 11, 11 on the hangers 22, 25 is a canister support arm 18 which carries a canister 19a for catalytic particles and a rigid tubular conduit 20 which has a flange 21 near one end for engagement with and detachment from the fill hole 13 of the catalytic purifier 2. The support arm 18 is adapted to carry the tubular conduit 20 and to place it in mating association with fill hole 13 by means of the flange 21. A handle 19 is provided at the free end of support arm 18 for use in manipulating arm 18 for raising and lowering the entire canister assembly. A second handle 20a is provided for transport of the entire assembly when not in use.

The vibrator portion of the catalyst changer is installed on the exhaust purifier by sliding the grip ends of the gripping members 22, 25 over the longitudinal flanges 11 of the exhaust purifier. The entire assembly may be slid along the flanges to any preselected position, but some positions are preferred over others, as will further become apparent. The adjustable travel toggle clamp 14 is then swung toward its closed position to fasten the device securely on the flanges 11 of catalytic purifier 2. The conical connector 6, which may easily be attached to and detached from the tailpipe 5, may then be urged frictionally over the end of tailpipe 5 and the vacuum aspirator 9 activated, creating a negative pressure within the purifier, since exhaust pipe 1 leads to the sealed engine system. The plug or cap normally covering fill hole 13 may then be removed, and the catalytic particles which are desired to be removed from the catalytic particle bed area 12 are, for the moment, restrained from dropping through the fill hole by the negative pressure within the exhaust purifier 2.

FIG. 3 shows a cross section of the catalytic purifier 2 with the sloping bed 12 filled with catalytic particles 23. The bed area is defined by grids 24 and the fill hole 13 is shown in mating connection with conduit 20. Flange 21 limits the distance through which conduit 20 may be inserted into fill hole 13. It engages and overlaps the supporting arm 18 and forms a support for the entire canister assembly 20.

In FIG. 3, the compressed air source 17, the separate carrying handle 20a and the vibrating motor 16 are shown as in FIG. 1. The cut-away portion in FIG. 3 reveals the hanger 25 which is substantially parallel to the hanger 22 (see also FIG. 4). Hanger 22, as shown in FIG. 4, is pivotally attached at 49 to support 15 which slidably engages another support 26 which is fixed to hanger 25. The vibrating motor 16 is carried, by means of bolts 48 and angle iron 27 (FIG. 3), by the support 26, to which it is welded, off center with respect to the support 26. The function of this mounting is to provide torque to the clamping device as will further become apparent.

Supporting arm 18 in accordance with this invention, has two separate adjacent ends 31 and 32, which project at different angles. A slot 28 is formed in support 26 and coacts with a pivot bar 29 to receive and engage one end 31 of the supporting arm 18, as appears in FIG. 3. Further, a slotted housing 30 engages another end 32 of the supporting arm 18. Supporting arm 18 is spring biased by spring 33, as appears in FIGS. 3 and 4.

Two ends 31, 32 of the supporting arm 18 are shown in FIGS. 3 and 4. End 31 is shown hooked under pivot bar 29 and end 32 is shown in engagement with slotted housing 30 and spring 33. The means for adjusting the return position of the support arm is shown comprising washer 35, nut 34, and threaded portion 36 of the lateral-pivot-end 32. Vibrating motor 16 is shown behind slotted housing 30.

After the fill hole plug has been removed, the operator may utilize handle 19 to displace support arm 18 to a position similar to that shown in the broken lines in FIG. 3. The pipe 20 may then be inserted with its supporting flange 21 overlapping the support arm 18, through the clearance in handle 19, (see FIG. 2) and the canister assembly may be moved in the direction of the broken arrow appearing in FIG. 3, to assume a position where the pipe 20 is located directly under the fill hole 13. As the operator releases handle 19, spring 33 automatically lifts the support arm 18 to the position appearing in solid lines in FIG. 3. Nut 34 and washer 35 allow adjustment of the return-position of the support arm 18; this may be accomplished by turning nut 34 on the threaded portion 36 at the end 32 of support arm 18.

Once the canister assembly is retained in mating association with the fill hole in the exhaust purifier, the vacuum within the exhaust purifier may be dispensed with. Vibrator motor 16 is turned on and catalyst particles fall by gravity through the fill hole 13 and pipe 20 into canister 19a. The canister assembly may be removed by pressing down on the handle 19, sliding pipe 20 and flange 21 toward handle 19 until the pipe 20 and canister 19a are disengaged from arm 18, and the particles may be discarded or otherwise used.

A canister assembly filled with fresh catalyst particles may be fitted on the arm 18 in the manner heretofore described. Refilling of the catalytic bed 12 is accomplished by reactivating the vacuum transducer 9 to create a negative pressure within the exhaust purifier 2 while the vibrating motor 16 is also activated. The catalytic particles are drawn upwardly from the canister 19a, through pipe 20 into the inclined bed 12. When the particle bed is full and the particles tightly compacted within the bed, or at any other desired time, the canister 19a and its attached pipe 20 may be removed as heretofore described, the plug for the fill hole reinserted, and the vibrating motor and vacuum transducer deactivated. The particle exchange is now complete, and the entire catalyst changer may be removed from the purifier 2 of the motor vehicle, by sliding the hangers 22, 25 along the flanges 11, 11, until they clear the ends of flanges 11, 11, and then lowering the entire assembly until it clears.

Many advantages of the present invention in accomplishing the above described steps of catalytic exchange will now become evident, and also with reference to a description of the structure of a preferred embodiment, which follows. FIG. 4 shows a cross section of a preferred embodiment. The device is shown in a position of engagement on a relatively narrow purifier 2. Broken lines are used to show the position of engagement of the device on a relatively large purifier. Hanger 25 is shown with its channeled end embracing longitudinal flange 11. Hanger 25 is permanently affixed to support 26 which is slidably engaged with support 15 which carries the hanger 22 through a pivotal attachment 49. As shown in FIG. 4, hanger 22 has a channel at its upper end which is shaped to embrace a longitudinal flange 11. Accordingly, the entire catalyst changer can be hung from the flanges 11, 11 by the hangers 22, 25.

A spring tab 40, which is attached to support 15, is biased to urge the hanger 22 toward a stop 41, which is desirably surfaced with blocks 42 of rubber or other resilient material. The adjustable travel toggle clamp 14 is mounted upon stop 41, and has a threaded spindle 42a which is adjustable by nuts 43 and has a replaceable oil-resistant neoprene rubber tip 44 which assists in compensating for manufacturing tolerance. In FIG. 4, the toggle clamp 14 is shown in its engaged position with tip 44 in engagement with the back of the channel near the top of the pivoted hanger 22. Phantom lines are used in FIG. 4 to show the toggle clamp in its released position; it will be appreciated that hanger 22 is pivoted away from flange 11 by the action of the spring tab 40, and resilient blocks 42 serve as limit stops for limiting the pivotal swinging movement of the hanger 22 away from the adjacent flange 11.

The apparatus shown in FIG. 4 is shown adjusted to a commercially-available small catalytic purifier. Phantom lines in the drawing show the parts in an adjusted position to accommodate a larger catalytic purifier. The basic adjustment is accomplished before sliding the device on the purifier 2, by inserting a lock pin 45 into pre-aligned holes which are located at predetermined positions in supports 15 and 26. Lock pin retainer 46 retains the lock pin 45 in the locking position. The additional hole 47, for example, formed in support 26, may be utilized with a larger catalytic purifier (see phantom lines in FIG. 4).

Vibrator motor 16 is mounted off center with respect to hangers 22, 25 and is also off center when the device is extended to its maximum position as shown in phantom. The vibrating motor 16 may be of a standard type selected for maximizing forces in the plane parallel to the plane of the longitudinal flange. As a result of the unique mounting of this motor in a position off center with respect to both axes in this plane, the torque exerted upon the support 26 produces an exaggerated vibration of the catalytic exhaust purifier.

Referring to FIG. 2, which is a plan view of the changer engaged upon a relatively small catalytic exhaust purifier 2, it will be seen that a larger catalytic exhaust purifier 2 is also shown by broken lines, this particular purifier having been selected for the fact that its exhaust port is not precisely perpendicular to the sides engaged by this embodiment of the invention. Such a configuration is not uncommon, being necessitated by space restrictions encountered in under-floor mounting on some automobiles, for example. FIG. 2 further illustrates the ease with which flanged fill pipe 50 may be slidably adjusted along the handle portions 18a, 18b, as well as the pivot characteristics of the bi-directional support arm 18 and its ability to accommodate to fill holes located in a variety of positions on the purifier.

In FIG. 2, the purifier 2 is shown connected between the exhaust pipes 1 and 3. The adjustable travel toggle clamp 14 mounted upon stop 41 is shown exerting a force against hanger 22, the channeled end of which is engaging a flange 11. Likewise, hanger 25, shown engaging another flange 11 with its channeled end, opposes the force exerted by adjustable travel toggle clamp 14, thereby assuring secure engagement of the catalytic purifier 2. Since the device is shown attached to a relatively small purifier, support 26 is shown extending beyond support 15. The cut-away portion in FIG. 2 shows the top of pivot bar 29 and a cut-out portion 15(a) of support member 15 providing clearance for that pivot bar. Lock pin 45 is shown extending through the four thicknesses of supports 15 and 26, and is shown held in place by retainer 46. Support arm 18 is shown attached to the clamping device and a second arm position providing for an alternative fill hole position on the larger catalytic exhaust purifier is shown in phantom. The supporting arm 18 is shown as a one-piece arm and may be made from a single rod or tube, with one end 31, two substantially parallel spaced arm members 18(a) and 18(b), a handle 19, and another end 32.

The opening defined by the handle 19 allows excellent clearance for insertion of the flanged conduit 20 which is represented in FIG. 2 by circular outlines 50. Dotted outlines 51 represent the fill hole locations of the catalytic exhaust purifiers 2, 2' shown in the drawing. In addition to facilitating precise location of the canister assembly, the bidirectional flexibility of the support arm prevents the torques of the vibrator motor from adversely affecting the function of that arm. The present invention minimizes fill-hole and conduit wear which would normally result from the vibration and provides a means of secure interconnection of the canister assembly to the exhaust purifier, thus facilitating efficient exchange of the catalytic particles.

Figure 5:
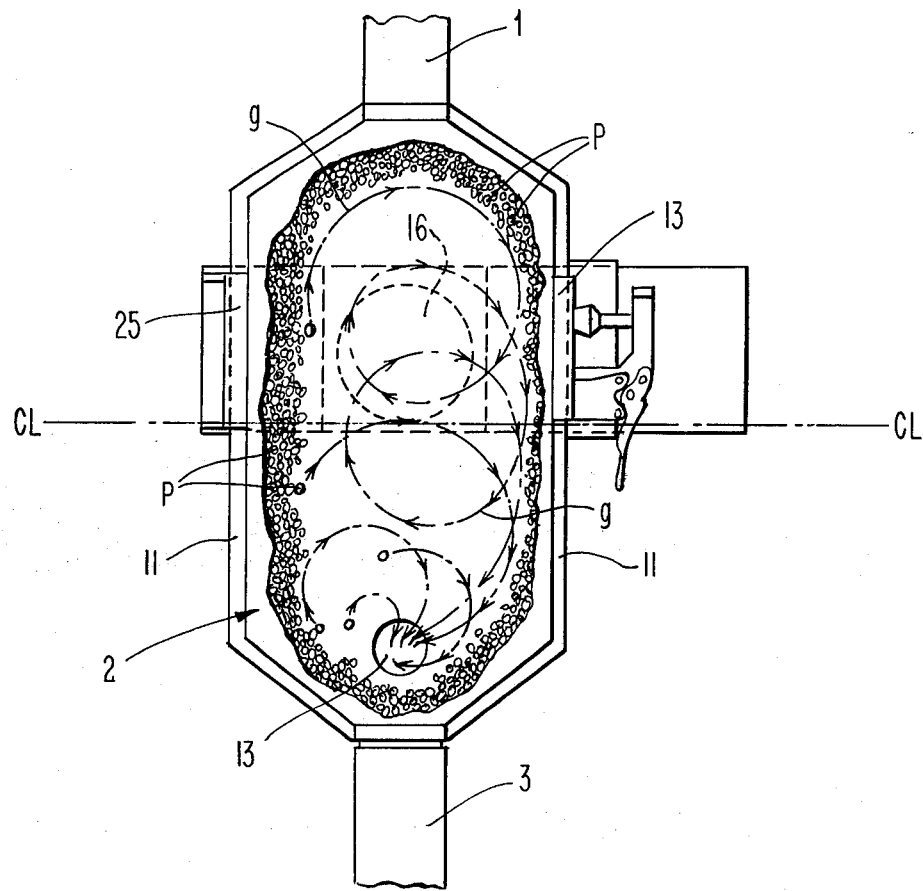
FIG. 5 is a schematic plan view of the catalyst bed, with the uppermost grid plate removed in order to reveal important movement patterns of catalyst particles.

The nature and positioning of vibrator 16 is of great importance, as is illustrated in FIG. 5, the top cover and uppermost grid plate being removed in order to illustrate important movement patterns of catalyst particles.

As shown in FIG. 5, the clamps 22, 25 are located near the forward extremity of the flanges 11, 11, farthest from the fill hole 13. This is a preferred position, as will become apparent.

Figure 6:
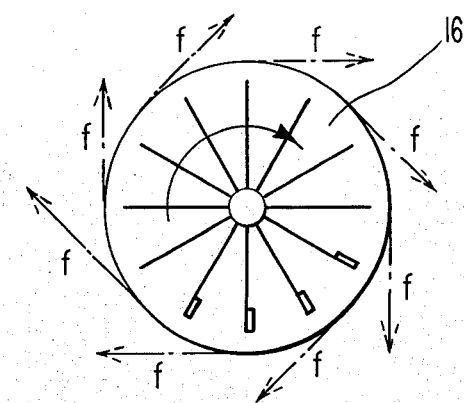
FIG. 6 schematically shows a vibrator.

The vibrator 16 preferably includes a plurality of vanes rotating around its center, some vanes being heavier than others, thus producing rotating vibrational forces like those indicated by the arrows (f) in FIG. 6. Because the clamps 22, 25 are pressed toward each other, transverse relative movement between the flanges 11 and their clamps 22, 25 is severely restricted.

The rotational vibratory forces generated by vibrator 16 are almost instantaneously transmitted to the entire purifier 2, causing it to oscillate back and forth in a swinging movement, about the center of rotation of vibrator 16 as an epicenter. This has a surprising effect upon the particles P, causing them to migrate in a generally clockwise path within the purifier 2 when the vibrator 16 is also rotating in a clockwise manner.

The arrows (g) in FIG. 5 show typical particle movement patterns, showing how they "wash" in a closed curved configuration, ultimately and quickly flowing to and through the fill hole 13. The particles even flow uphill when they are located at one side of the purifier (the right-hand side as viewed in FIG. 5).

The farther the center of vibrator motor 16 is spaced away from the fill hole 13, the more effective the vibrations have been found to be. Most preferably, the center of rotation of motor 16 should be on the other side of center line CL from the fill hole 13. However, some effect can be obtained at even less spacing, but it is not desirable to locate the vibrator motor 16 concentric with the fill hole 13.

The rotational vibratory forces should be directed to swing the fill hole 13 back and forth in approximately the plane defined by the flanges 11, 11 in order to obtain the unique vibratory particle movement illustrated in FIG. 5; forces generated by motor 16 are solidly communicated through the clamps 22, 25 to the flanges 11 and thus to the entire body of purifier 2.

It will be appreciated, accordingly, that the invention comprises an adjustable self-supporting clamping device having a unique vibrator, rigidly attached to the purifier 2 and having surprising effectiveness in removing catalytic particles and in assuring their compact insertion. The invention also discloses a double-pivotally attached bi-directional spring-loaded support arm for use in carrying a canister in a self-supporting manner fitted with an emptying and refilling conduit. Such a canister assembly is described in U.S. patent application Ser. No. 404,304, assigned to the assignee of the present invention. The unique way the clamping means cooperates with the vibrating means, and the way they both cooperate with the vacuum means attached to the tailpipe to create a negative pressure within the catalytic purifier, results in extremely fast and effective emptying and filling of the purifier.

In emptying the used particles from a purifier, the clamping means may be adjusted to correspond to a pre-selected width of the purifier model to be serviced. The catalyst changer unit then slides on its hangers 22, 25 onto the purifier along the longitudinal flanges which serve as tracks during positioning of the device, preferably with the vibrator 16 under the upper portion of the bed, if the bed is inclined.

The catalyst changer is very readily secured through activation of the adjustable-travel toggle clamp 14. Due to the unique structure of the clamp 14, slight variations in manufacturing tolerance are automatically compensated for. After the duct 7 and connector 6 have been attached to the tailpipe, means 9 is activated to create a negative pressure within the converter 2 and the plug covering the fill hole 3 is very easy to remove without spilling any catalytic particles out through the fill hole. At the convenience of the operator, an empty canister which has been fitted with a flanged conduit may be readied for insertion.

The canister and fill pipe are readily inserted by grasping the handle 18 and swinging the support arm 19 down away from the purifier 2, against the resistance of the spring 33, then slipping the flange 21 of the fill pipe 20 through the large clearance in the handle 19 and shifting it toward the ends 31, 32 of the arm 18 until the flange 21 rests upon the arm portions 18a, 18b, which appear in FIG. 2. Once so positioned, the canister fill pipe may be positioned precisely under the fill hole of the purifier 2; lateral positioning may readily be accomplished by swinging the arm 18 about end 32 which functions as a pivot. Once the canister is aligned with the fill hole, releasing the handle 19 very conveniently results in a self-sustaining arrangement in which the spring 33 acting through arm 18, holds up the entire canister assembly during the entire emptying process.

After the canister assembly is in place, the vacuum aspirator 9 is deactivated.

The vibrator 16, as stated, is located on the clamping device in a position which maximizes the torque which it applies to the purifier. It has been discovered that particles are best dislodged and evacuated if the purifier is caused to vibrate in an off-center configuration and with its axis in a definite relationship with the direction of clamping, all as heretofore set forth in this specification. Substantially transverse vibrations, effective only back and forth straight across the purifier 2, were found to cause the particles to "jump" from the bed grids but to cause only slight lateral displacement of the particles toward the fill hole. The unique vibrational configuration of this invention causes rapid movement of substantially all particles toward the fill hole, and this is an important and advantageous feature of the invention. Furthermore, the off-center vibrational pattern tends to remove clumped particles from recesses in which there is little or no room for transverse displacement. The rotational, off-center vibrational pattern also promotes substantially complete emptying of the bed, since static wave patterns cannot form around the fill hole near the termination of the evacuation cycle.

After particles have been removed from the catalyst bed, or at any time when it is partly or completely empty, the vibrator 16 may be deactivated and the canister assembly removed and replaced by an assembly containing a fresh supply of particles in a manner similar to that described earlier. The vibrator and vacuum means are both reactivated and the particles are drawn into the catalyst bed through the fill hole. During this stage, the vibrator assists in redistributing the particles evenly and compactly throughout the bed and in the compacting them in place.

Once again, the rotational torques applied by the vibrator to the purifier result in substantial benefits. As the particles are drawn into the catalyst bed as a result of the negative pressure therein, the off-center vibrational pattern aids in dispersing the particles throughout the bed surface. When the bed is sloped, its slope is usually slight and the static friction of the particles on the grid is overcome by the rotational vibration of the purifier. In this stage dispersion is favored over gravitational aggregation and the particles are displaced into even the smallest and most remote recesses of the bed. As the process nears completion, the vibration assures a tight even configuration throughout the length, width and height of the bed.

When the fill is complete, the vacuum may be continued briefly, the canister assembly can be removed as before, and the fill hole plug inserted. The vacuum aspirator 9 may be shut off, and the catalyst changer removed from the purifier by releasing the toggle clamp 14 and sliding the entire changer off the flanges 11 of the purifier 2. The spring tab assembly ensures that the gripping members will automatically disengage the purifier, eliminating the possibility that road tars and other similar residues could impede removal.

The entire process as described is safe, fast, clean, efficient, and requires little skill or training. Within minutes it is possible for the ordinary mechanic completely to remove and replace the most contaminated of catalytic particles, without removing the purifier from the vehicle and using nothing but the power sources found in most repair bays. By reducing the time and effort required to facilitate complete exchange of catalyst particles, the present invention makes their removal and replacement economically feasible and ecologically desirable.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

I claim:

1. In a system for exchanging catalytic particles in a horizontally disposed catalytic exhaust converter having external longitudinal flanges containing a catalyst bed and a bottom fill hole therein, said system having at least one canister assembly constructed and arranged to selectively receive or supply said catalytic particles, vacuum means for creating negative pressure within said converter, means supported from said converter arranged to engage said canister assembly in connection with said fill hole, and means for shaking said converter, the improvement wherein said shaking means is fixedly carried by a removable gripping means arranged to selectively engage said converter at spaced-apart points along a transverse line which is longitudinally spaced from said fill hole, said gripping means comprising a transverse first supporting member spacedly suspended from said converter, a second supporting member affixed to and extending upwardly from said first supporting member, and a second gripping member pivotally attached to and extending upwardly from said second supporting member, said gripping members having their upward ends shaped for engagement with said flanges.

2. The system defined in claim 1, wherein the longitudinal spacing of said gripping means from said fill hole is such as to dispose said shaking means on the other side of the transverse center of said converter with respect to said fill hole.

3. The system defined in claim 1 wherein adjustment means are provided for interlocking said supporting members at predetermined positions along the path of slidable engagement.

4. The system defined in claim 3, wherein said adjustment means comprises a lock pin, said second supporting member has a hole therein, said first supporting member has a plurality of holes matably alignable with said hole in said second supporting member at preselected positions along the path of sliding engagement of said first and second supporting members, and a retaining means for maintaining the lock pin in penetrating engagement with said first and second supporting members.

5. The system defined in claim 1, wherein said gripping means further comprises engagement means for applying a transverse force whereby said gripping members squeeze said converter.

6. The system defined in claim 5, wherein the engagement means includes an adjustable travel toggle clamp.

7. The system defined in claim 1, wherein said gripping means further comprises retention means arranged to limit the arc of swing of said second gripping member to a position substantially parallel to said first gripping member.

8. The system defined in claim 7, wherein said retention means comprises a stop member having a resilient surface.

9. The system defined in claim 1, wherein said gripping means further comprises disengagement means to apply a force directed substantially in the plane defined by said gripping members, said force being applied on said second gripping member and away from said first gripping member.

10. The system defined in claim 9, wherein said disengagement means comprises a tab mounted on said second supporting member.

11. The system defined in claim 1, wherein said vibrator means arranged in a position off-center with respect to both the longitudinal and transverse axes in a horizontal plane to provide off-center rotational torque.

12. The system defined in claim 4, wherein said second supporting member has a plurality of holes therein respectively matably alignable with said holes in said first supporting member.

13. In a system for exchanging catalytic particles in a horizontally disposed longitudinal-flange sloped-bed catalytic exhaust converter having a catalyst bed fill hole in the bottom surface thereof, said system comprising:
   a. a canister assembly arranged to selectively receive and supply said catalyst;
   b. vacuum means arranged for creating negative pressure within said converter;
   c. support means for engaging said canister assembly in mating connection with said fill hole; and
   d. means for shaking said exhaust converter, the improvement wherein said support means for engaging said canister assembly in mating connection with said fill hole comprises a transverse supporting member spacedly suspended from said converter carrying said means for shaking said converter and a support arm double pivotally attached thereto providing both vertical and horizontal arcuate movement of said support arm.

14. The system defined in claim 13, wherein the double-pivotal attachment of said support arm is spring biased along an axis which is perpendicular to the plane which includes the longitudinal flange.

15. The system defined in claim 14, wherein one end of said support arm is differentiated into at least two pivot ends, said pivot ends being transverse to each other.

16. The system defined in claim 15, wherein a first pivot end engages a slotted pivot means for allowing limited arcuate movement of said first pivot end in a vertical plane.

17. The system defined in claim 16, wherein said slotted pivot means comprises a pivot slot defined in a top planar surface of said supporting member and a pivot bar substantially parallel to the plane defined by said planar surfaces and attached at the ends thereof to said planar surface and having a mid-portion displaced above and substantially parallel to said top planar surface.

18. The system defined in claim 15, wherein a second pivot end engages a spring-loaded pivot means for allowing limited displacement of said second pivot end in the plane which includes said second pivot end and the axis of said support arm and for allowing rotational displacement of said first pivot end around the axis of said second pivot end.

19. The system defined in claim 18, wherein said spring-loaded pivot means comprises a slotted housing and a spring bias means for returning said support arm to its undisplaced position with respect to the plane including said second pivot end and the axis of said support arm.

20. The system defined in claim 19, wherein said spring bias means comprises a spring and a spring bias adjustment means for selecting the undisplaced position of said support arm.

21. The system defined in claim 20, wherein said spring adjustment means comprises a washer, a nut, and a threaded portion on the second pivot end.

22. The system defined in claim 13, wherein said support arm further comprises a supporting portion and a handle, said supporting portion being formed by two substantially parallel spaced supporting portion members and said handle defining a clearance opening contiguous to the opening between said supporting portion members.

23. The system defined in claim 13, wherein said supporting arm is formed from a single continuous member, the ends of which form first and second pivot ends of said double pivotally attached support arm, and the midsection of which forms the supporting portion and handle of said support arm.

* * * * *